Figure 1:
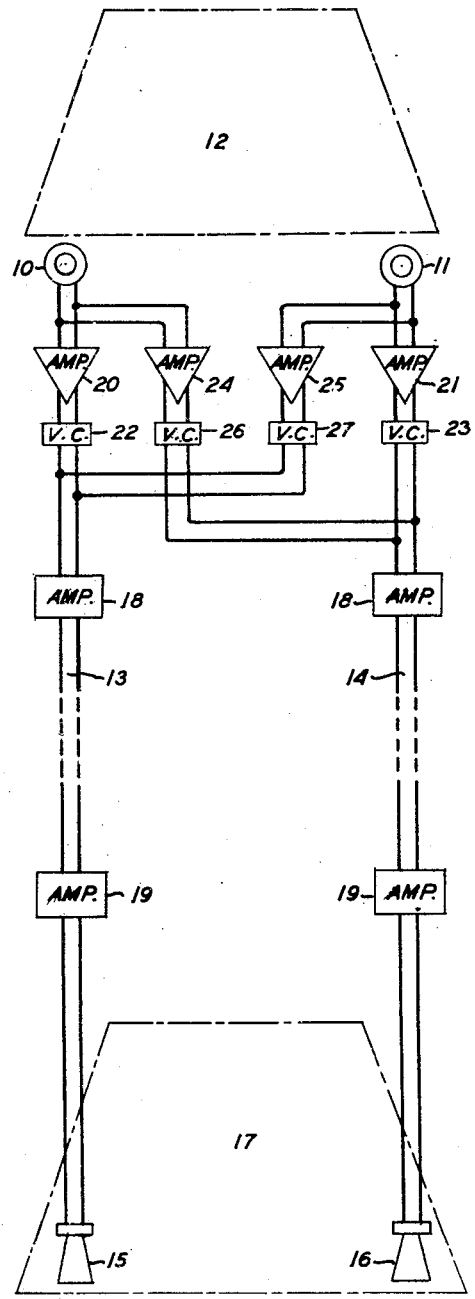

April 12, 1938.   R. T. FRIEBUS   2,114,019
SOUND REPRODUCING SYSTEM
Filed April 26, 1934   6 Sheets-Sheet 2

INVENTOR
R. T. FRIEBUS
BY
G. M. Campbell
ATTORNEY

Patented Apr. 12, 1938

2,114,019

UNITED STATES PATENT OFFICE 2,114,019

SOUND REPRODUCING SYSTEM

Reginald T. Friebus, Montclair, N. J., assignor, by mesne assignments, to Western Electric Company, Incorporated, a corporation of New York Application April 26, 1934, Serial No. 722,475

9 Claims. (Cl. 179—1)

This invention relates to systems for reproducing sounds either directly from sound pick-up devices or from records of the original sounds. More particularly, the invention relates to "stereophonic" systems which produce in the minds of the listeners the illusion of spatial distribution of the sounds being reproduced.

Systems capable of producing this type of illusion in general involve the use of two or more spaced sound pick-up devices, a number of spaced receivers and separate circuits connecting the pick-ups with the receivers as fully explained in an article by J. C. Steinberg and W. B. Snow in "Electrical Engineering", January 1934. Such systems are intended for and adapted to the purpose of reproducing sounds with a spatial distribution similar to that of the original sounds. The important factors determining the lateral and the fore and aft distribution are fully explained in the article referred to above and may be briefly summarized as follows:

With a system of this type having two identical channels, the apparent lateral position between the loud-speakers of the sounds corresponding to an actual sound source between the microphones is largely fixed by the relative strengths of the "direct" sound waves at the two microphones whereas the fore and aft position of the reproduced sounds is largely determined by the ratio of the "direct" sound to the "average reverberant sound" at the microphone nearest the actual sound source. In general rooms suitable for sound pick-up purposes have an appreciable reverberation time so that each sound wave is reflected and re-reflected from opposite walls a sufficient number of times to produce substantially the same intensity of reverberant sound throughout the room. The effective intensity of the "direct" sound, however, increases rapidly as the source moves toward the pick-up point, so that when the proportion of direct sound in the output of a loud-speaker is increased, the listener hears the sound source as approaching the loud-speaker and when the proportion of direct sound is decreased, the sound source seems to recede from the loud-speaker.

The object of this invention is to reproduce sounds stereophonically with any desired spatial distribution irrespective of the location or the spatial distribution of the original sounds.

According to the invention, the direct sound energy and the reverberant sound energy supplied to a single or several spaced receivers are both arbitrarily varied to produce the desired motion or distribution of the virtual sources of reproduced sounds. At least two microphones are required. In order to produce apparent motion in the reproduction of a stationary sound source, the microphones are spaced with the source relatively close to one microphone and relatively distant from the other. The output of the close microphone will be largely produced by direct sound waves and the output of the distant microphone, for most rooms, will be largely produced by reflected or reverberant sound so that with proper mixing circuits the proportion of direct to reverberant energy supplied to each receiver and the relative amount of direct sound energy supplied to the several receivers can be varied at will. In this way, a stationary sound source can be reproduced as a moving source or a moving source can be reproduced as a stationary source or given any desired apparent motion in the reproduction irrespective of the direction of movement of the actual sound source.

In one embodiment of the invention, two spaced pick-ups and two spaced receivers are used. Each pick-up is connected through a separate volume control and unilaterally transmitting device such as a vacuum tube amplifier to each of the receivers. The sound source is positioned, or moves in the vicinity of one of the microphones and the several volume controls are operated in the combinations and sequences necessary to produce the desired effects.

Alternatively, in a multi-channel stereophonic system of the type described by Steinberg and Snow, each channel may be provided with an independent source of reverberant sound energy such as a second microphone disposed at a greater distance from the producing stage than the main pick-up and connected to the channel through a separate amplifier and volume controlling device. With this system, the ratio of direct to reverberant energy can be varied at will in each channel independently of the location of the sound source on the producing stage.

According to a further feature of the invention, each lateral channel is provided with a second loud-speaker disposed beyond the lateral limit of the reproducing stage and means are provided for fading between the two loud-speakers of these lateral channels for localizing sounds "offstage".

In the foregoing discussion immediate reproduction of the original sounds is assumed but it will be obvious that the receivers can be replaced by synchronized recording devices of any suitable type so that records may be made for subsequent use to produce the same sound distribution. The general procedure outlined above can be used to produce many varied and fantastic effects, some of which would be physically impossible to achieve by the actual motion of a real sound source on the producing stage. The reproduction of a large orchestra can be compressed into any desired area, one side of the orchestra or both sides simultaneously can be made to appear to move to the other side and by using an additional distant microphone or by moving one of the microphones in the manner more fully explained below while manipulating the volume controls, the whole orchestra will appear to rotate as a unit. The utility of the invention is not confined to making a sound source appear to perambulate. For example, a large variety of organ effects are obtained by using a distant set of pipes antiphonally and for other purposes. Such effects can readily be simulated according to the invention with any type of sound source by fading the amplifiers between the near and distant microphones.

The invention may be used as an independent system to produce sound effects for dramatic purposes, or as an adjunct to other sound reproducing systems with or without motion pictures or other visual accompaniment.

The invention will be more fully understood from the following detailed description and the accompanying drawings in which—

Figure 2:
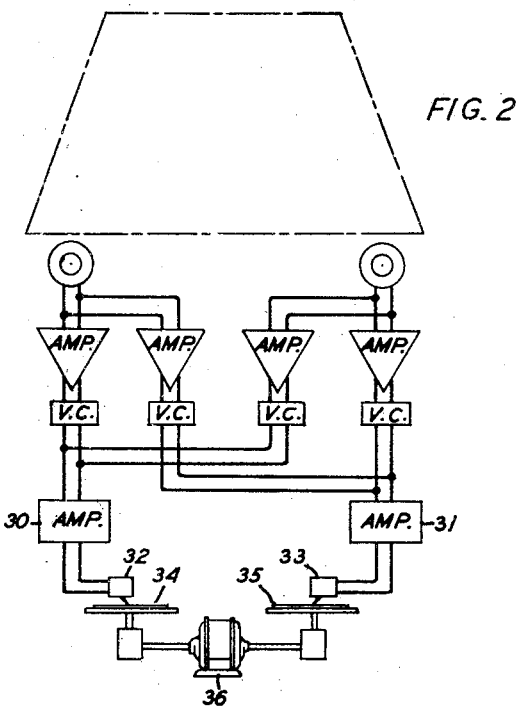
Figure 3:
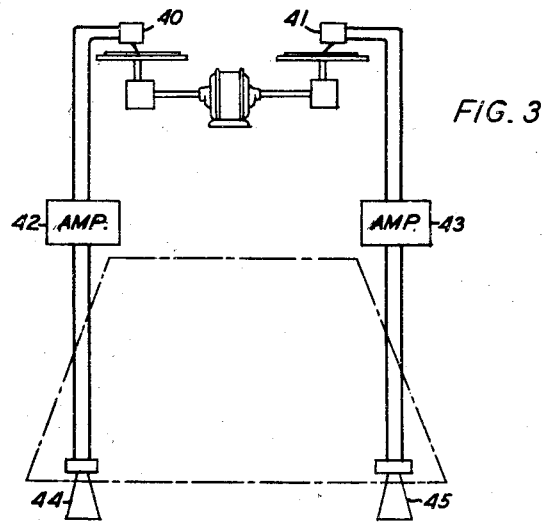
Figure 4:
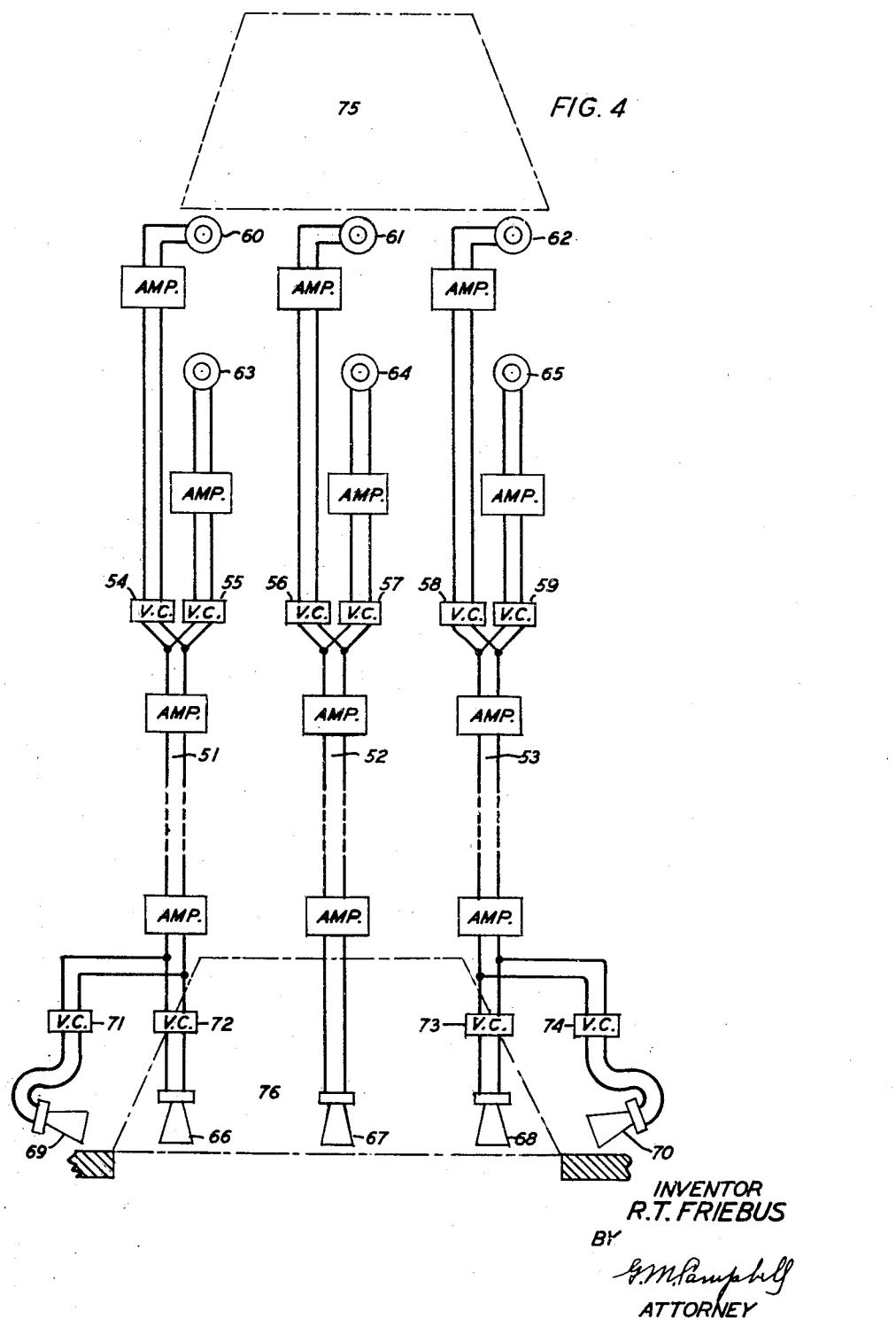
Figure 5:
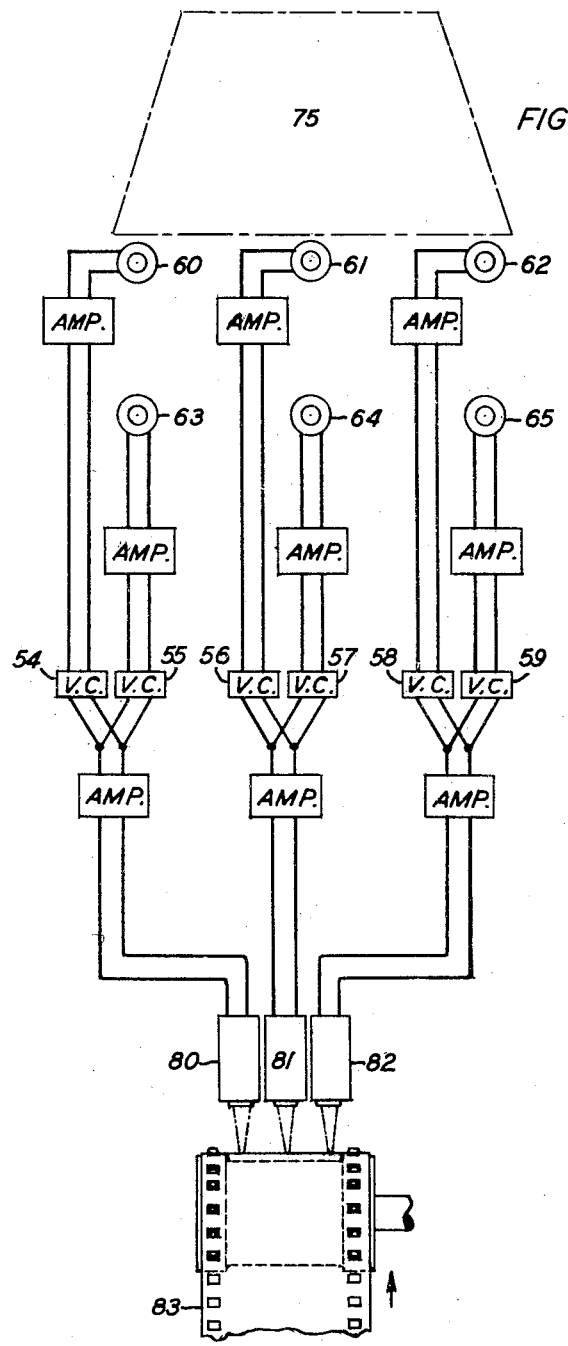
Figure 6:
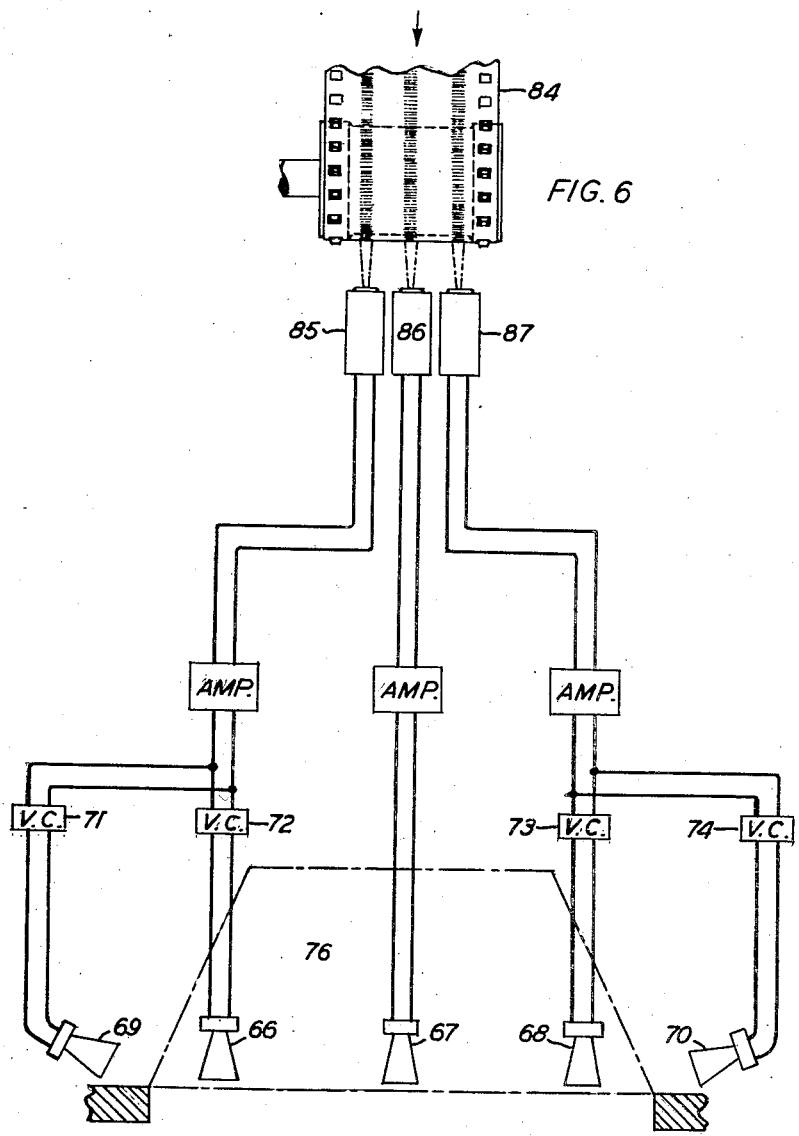
Figure 7:
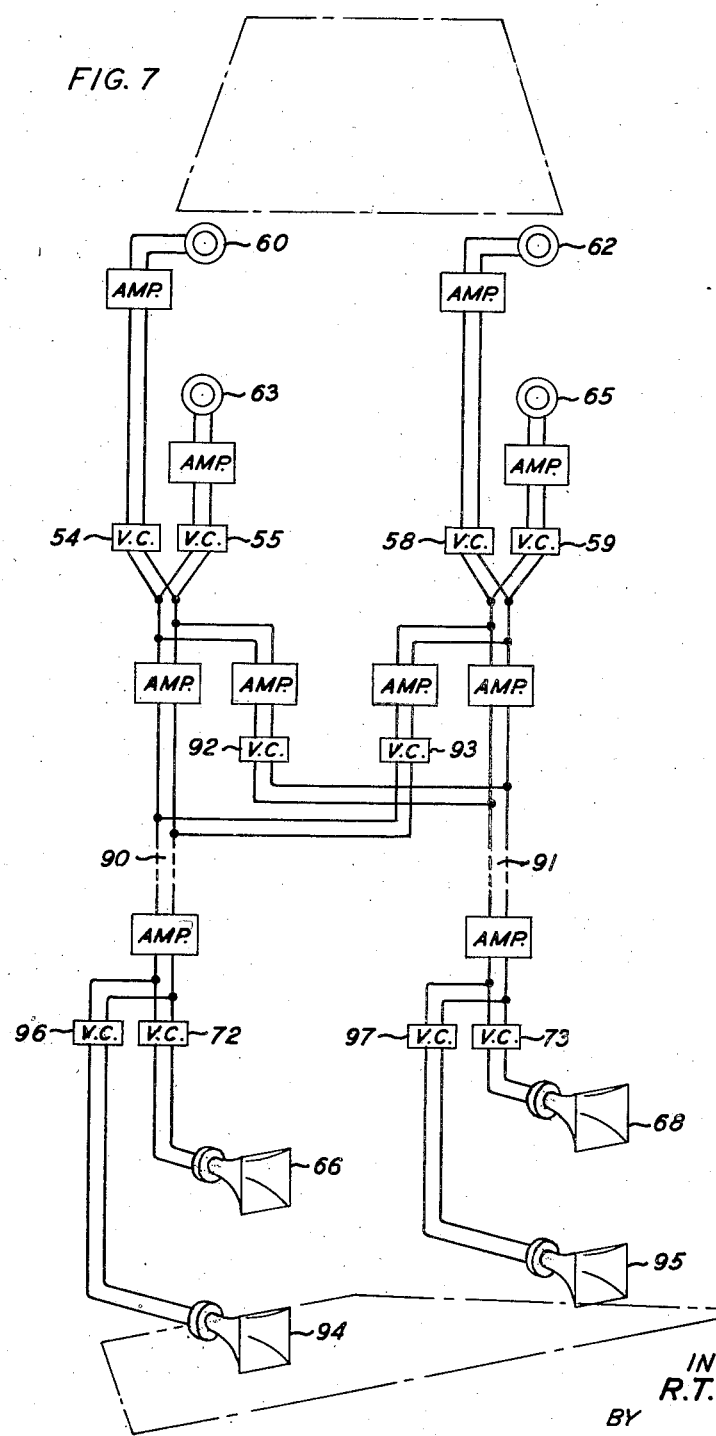

Fig. 1 is a stereophonic system according to the invention of a type suitable for immediate reproduction of the sound;

Figs. 2 and 3 together show a system of the general type of the system of Fig. 1 but in which records of the sounds are made for subsequent reproduction;

Fig. 4 is an alternative system for direct stereophonic reproduction in which each channel has its own source of both direct and reverberant sound energy;

Figs. 5 and 6 together show a system of the type shown in Fig. 4 but in which the sounds are recorded for subsequent reproduction and Fig. 7 shows a system which combines the advantages of the systems of Figs. 1 and 4.

In the system of Fig. 1 two sound pick-ups or microphones 10 and 11 spaced in front of the sound producing area or dummy stage 12 are connected by separate transmission lines 13, 14 to two loud-speakers 15, 16 correspondingly located near the front of the reproducing stage 17. Each line is provided with a suitable power amplifier 18 and particularly in cases where the lines are long, as for example, when the two stages are in different cities, receiving amplifiers 19 are also used. The pick-ups are connected to the corresponding amplifiers 18 through preliminary amplifiers 20, 21 and volume controlling devices 22, 23. Each pick-up is also connected to the other line through similar preliminary amplifiers 24, 25 and volume controls 26, 27. With this arrangement the output of each microphone may be divided between the lines 13 and 14 in any desired proportion. When the volume controls 22 and 23 are set for the same transmission efficiency in each of the lines and the controls 26 and 27 are set for zero transmission a moving sound source on the dummy stage will appear to move in a similar manner on the reproducing stage 17 in accordance with the teachings of the prior art.

Keeping in mind the factors controlling the spatial distribution of the reproduced sound it will be readily understood that this system is capable of making the reproduced sound trace a path on the reproducing stage different from the path of the actual source on the dummy stage. Assume, for example, that a singer is standing close to the left-hand microphone 10 and therefore at some distance from the right-hand microphone 11. The output currents of the microphone 10 will be of a distinctly "close-up" character, that is to say, the direct sound waves will be relatively stronger than the reflected sound waves reaching the microphone. By the use of volume controls 22 and 26 these currents representing close-up sound can be admitted into the lines 13 and 14 and the loud-speakers 15 and 16 on the stage 17 in any desired proportions. Likewise, the currents in the output circuit of the microphone 11 are distinctly "distant" in characteristic due to the relatively great distance between this microphone and the singer. By the use of volume controls 27 and 23 this distant sound energy can be admitted into the two channels and loud-speakers in any desired proportions. When the volume controls are adjusted so that a large proportion of direct sound energy is fed into the line 13 the voice on the stage 17 appears to be located close to the speaker 15. As more of this direct sound energy is admitted into the line 14 the apparent source moves away from the speaker 15 toward the speaker 16, in the direct ratio to the proportions of the direct sound admitted to each line. After the voice is brought to the center of the stage by admitting equal amounts of energy into each line the volume level in line 13 is gradually reduced and the voice continues to move to the right and reaches a point close to the speaker 16 when the energy in line 13 is very low in proportion to the energy in line 14. Similarly, the voice can be made to move across the rear of the stage. If an amount of distant sound energy is admitted only into the line 14 the voice appears to be at the rear of the stage 17 behind the loud-speaker 16 and progresses toward the left rear of the stage as more of this distant sound energy is admitted into the line 13. After the sound source has reached the rear center stage position the energy level in the line 14 is gradually reduced to zero as before and the source thereupon moves to a position directly behind the loud-speaker 15. The sound source may then be moved forward to its starting position by introducing into the line 13 "close-up" sound energy from the microphone 10 and at the same time decreasing the "distant" energy in this line from the microphone 11.

In the above experiment the simplest procedure for obtaining apparent motion is set forth but a better stereophonic illusion will be obtained by manipulating the volume controls in pairs and in this way the total volume of reproduced sound may be kept at a natural level. When it is necessary to increase either the "close-up" or the "distant" energy in one line a corresponding decrease may be made in the amount of energy of the same type introduced into the other line. Similarly, reductions in the energy level in one line may be compensated by increases in the other line within the limits of the desired variations in volume of the total sound.

Having in this way delineated the boundaries of the reproducing stage and determined the manner in which the several volume controls must be varied to move the sound source around the stage, the necessary combinations of settings for producing any desired movement within the prescribed area may be readily determined by experiment.

The problem becomes somewhat more complex when a multiple sound source such as an orchestra extending across the whole stage is used. In such a case, although there will be "close-up" and "distant" sound energy in both microphone circuits it is nevertheless possible to move such a sound source laterally with the technique already described. For example the left side of the orchestra may be moved to the right of the reproducing stage and vice versa by simultaneously attenuating the output level of amplifier 20 about 25 decibels from its normal value with volume control 22 and increasing the output level of amplifier 24 from about −25 decibels to normal value with volume control 26 and similarly reducing and increasing the levels of the output of amplifiers 21 and 25 with volume controls 23 and 27 respectively. This procedure may be simplified by ganging the controls so that the two controls on each pick-up are operated in pairs. If rotating contact potentiometers are used, for example, the pair may be connected in opposite polarity and operated by the same shaft. When only one of the pairs of controls is so operated the orchestra will appear to move into a small area at one side of the stage but if both pairs are operated together the whole orchestra will appear to have been "pulled through itself" from left to right and from right to left.

Other interesting and fantastic effects may be obtained by moving one or both of the microphones with respect to the sound source while the controls are being manipulated. For example, the whole orchestra can be made to appear to rotate as a unit in the following manner. The volume controls are manipulated in the manner just described to "pull the orchestra through itself" and then the process is reversed to restore the players to their original relative location. For a clockwise rotation of the orchestra the pick-up 10 is moved slowly forward away from the orchestra and the pick-up 11 is moved backward closer to the orchestra during the first quarter of the rotation during which the whole orchestra is being concentrated along the center line of the stage. By this procedure the sound from the left side of the orchestra as received by the pick-up 10 gradually changes its characteristics from "close-up" to "distant" thereby pulling its sound image to the rear of the reproducing stage while it is being shifted laterally with the controls. At the same time the sound from the right side of the orchestra as received by the pick-up 11 becomes more and more predominantly "close-up" in characteristic thereby pulling its sound image forward on the reproducing stage. When the microphones have been moved to their extreme positions as determined by experiment and the controls are in the mid-positions the orchestra will appear to have been rotated through 90 degrees. For the second quarter of rotation the microphones are then moved slowly back to their original positions while the volume controls are being operated to their limiting positions in which, as already stated, the outputs of amplifiers 20 and 21 are attenuated about 25 decibels and the outputs of amplifiers 26 and 27 are restored from about −25 decibels to full normal level. The orchestra has then been moved by rotation through 180 degrees to occupy the same position as in the experiment previously described in which the movement was purely lateral. The rotation through the next 180 degrees is accomplished in a similar manner by restoring the volume controls to their original position and simultaneously moving the pick-ups in the reverse manner from that already described. That is, during the third of the quarter the pick-up 10 is moved slowly backward toward the orchestra and the pick-up 11 is moved forward away from the orchestra while the controls are returned half way from their limiting position toward their original positions. This places the sound image of the orchestra along the center line of the stage. The last quarter of rotation is obtained by gradually restoring the pick-ups and controls to their original positions.

In order to keep the virtual image of a large orchestra within the confines of a reproducing stage of limited depth during the rotating movement it may sometimes be desirable to rotate only one-half of the orchestra and move the other half laterally across the front of the stage. This is readily accomplished by moving only one microphone (in the case described, microphone 10) during the operation of the controls.

The fore and aft locations of the microphone with respect to the sound source and the distance through which they must be moved to produce the effect described with best results will, of course, depend upon a number of factors such as the reverberation time of the producing and reproducing studios and the size of the sound source.

Figs. 2 and 3 of the drawings show respectively recording and reproducing systems by means of which records may be made and reproduced to give any of the effects obtainable with the system of Fig. 1. The apparatus of Fig. 2 and the manner of its operation are identical with the system of Fig. 1 except that in Fig. 2 the output of the amplifiers 30, 31 is fed to recorders 32, 33 cooperating with the record blanks 34, 35 synchronously driven by the motor 36. For reproduction, these records or pressings 37, 38 made therefrom are then synchronously rotated by the motor 39 of Fig. 3 and the reproducers 40, 41 deliver their outputs to amplifiers 42, 43 and loudspeakers 44, 45 which reproduce the sound effects in the same manner as in Fig. 1. For convenience in reproducing and to insure exact synchronism of the reproduced sounds it may be desirable in some cases to record the sound energy of both channels on a single record member, as for example, in concentric spirals of the same phonograph record as shown in Patent 1,508,432 to Wier, September 16, 1924.

The system of Fig. 4 may be used instead of the system of Fig. 1 for reproducing sound effects simultaneously with their production upon a more or less remote "dummy" stage. In this case, however, each of the three channels 51, 52 and 53 is provided with a "close-up" microphone and a "distant" microphone each of which is connected to the channel through a separate amplifier and volume controlling device. With a system of this type in which the proportion of direct to reverberant energy in each channel may be controlled independently of the other channels much better perspective of "stereophonic" effects may be obtained. For some purposes it may be desirable to operate each of the six volume controls 54 to 59 separately but in other cases the two controls on each channel may be operated together as described in connection with the system of Fig. 1. The provision of the center channel in this system while making it somewhat more complex gives more accurate control of the sound distribution at center stage particularly in a fore and aft sense.

With this system it will be evident that since each channel has its own source of reverberant sound no movement of the main microphones 60 to 62 is necessary to produce rotational or other fore and aft movements. For example, in rotating an orchestra instead of moving the microphone 60 farther away the controls 54 and 55 are operated to "fade-in" a greater proportion of the distant sound energy from the microphone 63 and instead of moving microphone 62 closer to the orchestra controls 58 and 59 are operated to "fade-in" more energy from microphone 62 and less from the microphone 65.

In addition to the main-loud-speakers 66 and 68 the outer channels 51 and 53 may be provided with auxiliary loud-speakers 69 and 70 located some distance offstage and volume controls 71 and 72, and 73 and 74. These auxiliary loud-speakers are particularly useful in cases where bands or other sound sources are to be reproduced as approaching or receding from the stage in a lateral sense. If, for example, a band on a "dummy" stage 75 is to be reproduced as moving across the stage 76 from left to right "distant" sound energy from microphone 63 may be admitted to channel 51 and the volume control 71 adjusted to reproduce mainly by means of the loud-speaker 69. While gradually increasing the volume level, control 54 is operated to bring in more direct sound and controls 71 and 72 are operated to "fade-over" to the loudspeaker 66. When the band appears to have reached the stage it is moved across it with the controls 54 to 59 in the manner already described. It is then moved offstage to the right by gradually fading over to loud-speaker 70 by means of the controls 73 and 74, the volume is then gradually reduced and an increasing proportion of distant sound is admitted to channel 53 and the band passes out of hearing to the right of the stage.

In Figs. 5 and 6 the system of Fig. 4 is shown as a recording and reproducing system in which the recorders 80, 81 and 82 make three sound tracks on the moving film 83. A corresponding print 84 (Fig. 6) is then reproduced by the reproducers 85, 86 and 87 which deliver their outputs to the loudspeakers for reproduction of the sounds in the same manner as in Fig. 4.

In Fig. 7 the interfading feature of Fig. 1 is combined with the close and distant microphone feature of Fig. 4 to provide a very flexible system which is particularly useful in cases where the sound source covers a large area as in the case of an orchestra or where several spaced sources are producing sounds at the same time as in the case of actors speaking simultaneously. The system of Fig. 1 is quite satisfactory when only a single actor is speaking near one microphone but when a second actor speaks near the other microphone the voices cannot readily be localized independently of each other. The system of Fig. 4 by virtue of the two microphones in each channel is not subject to this limitation but is not as well adapted to producing apparent lateral movements as the interfading circuit of Fig. 1.

In the combined system of Fig. 7 the two channels 90 and 91 may terminate in loud-speakers as shown or the system may be used for making sound records as in the systems already described. In view of foregoing discussion it will be apparent that energy may be introduced into channel 90 from the microphones 60 and 63 in any desired proportions by means of the controls 54 and 55 or from microphones 62 and 65 by means of controls 58 and 59 and the interfading control 93. Channel 91 may be controlled in a similar manner by means of the microphone controls and the interfading control 92.

A further feature of the invention shown in this system but equally applicable to any of the others described comprises loud-speakers 94 and 95 disposed above the loud-speakers 66 and 68, respectively, and connected to the channels through controls 96 and 97. By interfading between the speakers 94 and 66 by controls 96 and 72 and between the speakers 95 and 68 by controls 97 and 73 the sounds may be reproduced on any desired plane above the stage up to the height of the upper loud-speakers. For best operation, however, the vertical spacing of the loud-speakers should not be greatly in excess of the spacing of speakers 66 and 68. By operating only one set of these controls the plane of the reproduction may also be inclined in either direction at any desired elevation.

It will be understood that the various systems described are capable of wide variety of uses other than those mentioned by way of illustration and that the invention is intended to be limited only by the scope of the following claims.

What is claimed is:

1. In a transmission system, two spaced sound pick-up devices, two spaced receiving devices, a unilaterally conducting circuit between each pick-up device and each receiving device, and means for controlling the energy level in each of said circuits.

2. In a transmitting system, a first sound pick-up actuated largely by sound waves coming directly from a sound source, a second sound pick-up actuated largely by reflected sound waves set up by the sound source, two spaced receiving devices, circuit connections between each of the pick-ups and each of the devices, and means for controlling the proportion of the output of each pick-up supplied to each device.

3. In a stereophonic transmitting system, a plurality of sound pick-ups in spaced relation close to a sound source, a plurality of sound pick-ups in spaced relation at a distance from the sound source, a plurality of transmitting circuits and associated receiving devices, and means for introducing into each circuit currents from one of the close and one of the distant sound pick-ups.

4. In a stereophonic reproducing system at least two spaced loud-speaking receivers, a transmission line connected to each receiver, means for introducing into each line currents representing both direct and reverberant sound from the same sound source and means for varying the proportions of the direct and reverberant sound energy introduced into each line.

5. The method of producing stereophonic stage effects which comprises generating currents representing sound waves close to an actual sound service, generating currents representing sound waves at a distance from said actual source, mixing said currents in varying proportions in accordance with the spatial distribution desired and retranslating said mixed currents into sounds.

6. The method of producing stereophonic stage effects which comprises generating currents representing sound waves close to an actual sound source, generating currents representing sound waves at a distance from the source, mixing the currents in different proportions, separately transmitting the mixed currents and retranslating said currents into sounds at fixed spaced points.

7. In a system for producing stereophonic stage effects the combination with a source of currents representing sound waves near a sound source, a source of currents representing sound waves at a distance from the sound source and a loud-speaking receiver on the reproducing stage, of a second receiver located offstage, a transmission line between the current sources and the receivers, and means for fading the transmitted currents from one receiver to the other.

8. In a stereophonic transmitting system the combination with two transmission lines, receiving devices therefor, a close-up and a distant sound pick-up and volume controls therefor connected to each line, of interfading circuits between the lines each including a volume control and a unilaterally conducting device.

9. In a stereophonic reproducing system the combination with a plurality of transmission lines, spaced main loud-speakers and means for introducing into each line currents representing sounds at a plurality of pick-up positions, of auxiliary loud-speakers in vertical spaced relation to the main loud-speakers and a volume controlling device between each loud-speaker and one of the lines.

REGINALD T. FRIEBUS.